United States Patent [19]

Yonezu et al.

[11] 3,981,742

[45] Sept. 21, 1976

[54] HIGH POWER LEAD ACID BATTERY

[75] Inventors: Kunio Yonezu; Masaharu Tsubota; Kenji Asai, all of Kyoto, Japan

[73] Assignee: Japan Storage Battery Co., Ltd., Kyoto, Japan

[22] Filed: Feb. 10, 1975

[21] Appl. No.: 548,842

[30] Foreign Application Priority Data

| Feb. 9, 1974 | Japan | 49-16730 |
| Mar. 18, 1974 | Japan | 49-31482 |
| June 8, 1974 | Japan | 49-66711 |
| June 8, 1974 | Japan | 49-65387 |

[52] U.S. Cl. ............... 429/123; 429/160; 429/161; 429/241
[51] Int. Cl.² ......................... H01M 4/36
[58] Field of Search ............ 136/26, 36-67

[56] References Cited
UNITED STATES PATENTS

| 455,968 | 7/1891 | MacLaughlan | 136/36 |
| 2,515,204 | 7/1950 | Evans | 136/36 |
| 3,275,473 | 9/1966 | Barnett et al. | 136/36 |
| 3,795,543 | 3/1974 | Pol | 136/26 X |
| 3,852,111 | 12/1974 | Brinkmann | 136/26 |

*Primary Examiner*—John H. Mack
*Assistant Examiner*—C. F. Lefevour
*Attorney, Agent, or Firm*—Sughrue, Rothwell, Mion, Zinn and Macpeak

[57] ABSTRACT

A lead acid battery suitable for high power application, having elements comprising a plurality of positive and negative plates which are composed of grids formed with band-shaped portions at one end facing to the side wall of container, and layered one upon another with separators put therebetween in such a way that the respective band-shaped portions for the positive plates and negative plates respectively face to the opposing side walls of the container, the positive plates and the negative plates being respectively connected at least at a part of the length of said band-shaped portions to thereby form straps.

10 Claims, 19 Drawing Figures

HIGH POWER LEAD ACID BATTERY

BACKGROUND OF THE INVENTION

1. Field of the Invention

This invention relates to a lead acid battery and, in particular, to structures of its grids and elements.

2. Description of Prior Art

In conventional lead acid batteries, positive and negative plates used comprise grids composed of lead alloy and filled with active material, and lead alloy is also used as connectors for the connection of cells. However, such lead alloy has relatively high specific resistance, as for a metal, of about $2.5 \times 10^{-5} \omega.cm$ at 25°C and, hence, batteries of conventional structure can not supply high electric power because of their high internal resistance.

The object of this invention is to provide a lead acid battery having reduced internal resistance and, particularly, of higher power per unit volume (W/L). This invention relates to a lead acid battery having elements comprising a plurality of positive and negative plates which are composed of grids formed with band-shaped portions at one end facing to the side wall of a container, and layered one upon another with separators put therebetween in such a way that the respective band-shaped portions for the positive plates and negative plates respectively face to the opposing side walls of the container, the positive plates and the negative plates being respectively connected at least at a part of the length of said band-shaped portions to thereby form straps.

BRIEF DESCRIPTION OF THE ACCOMPANYING DRAWING

Figure 8A:
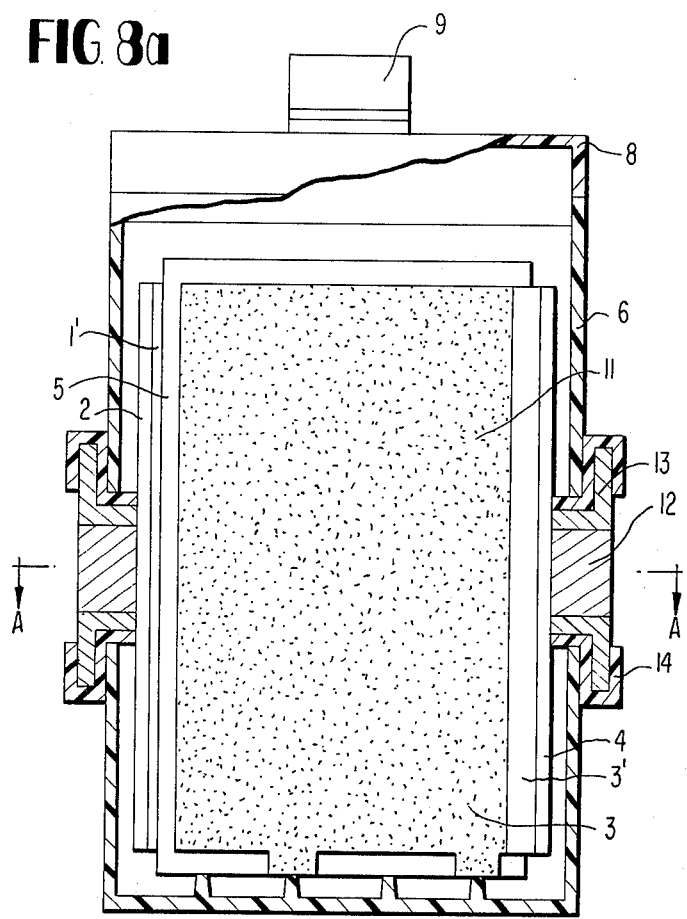
Figure 8B:
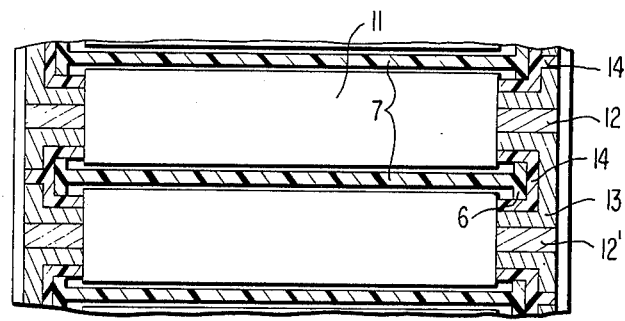
Figure 9:
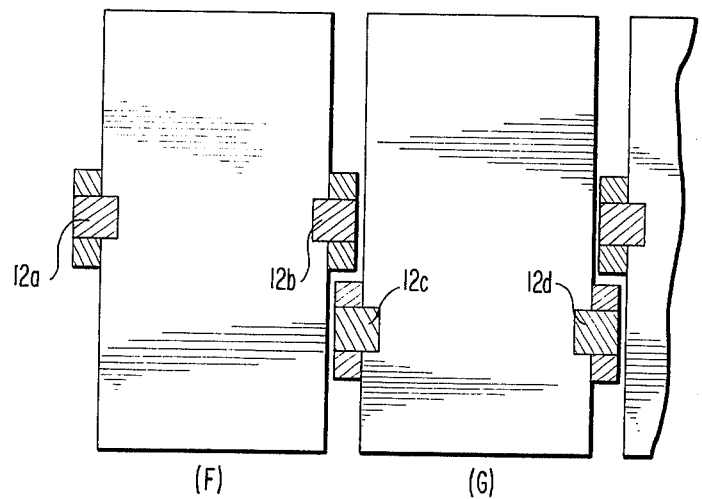
Figure 11:
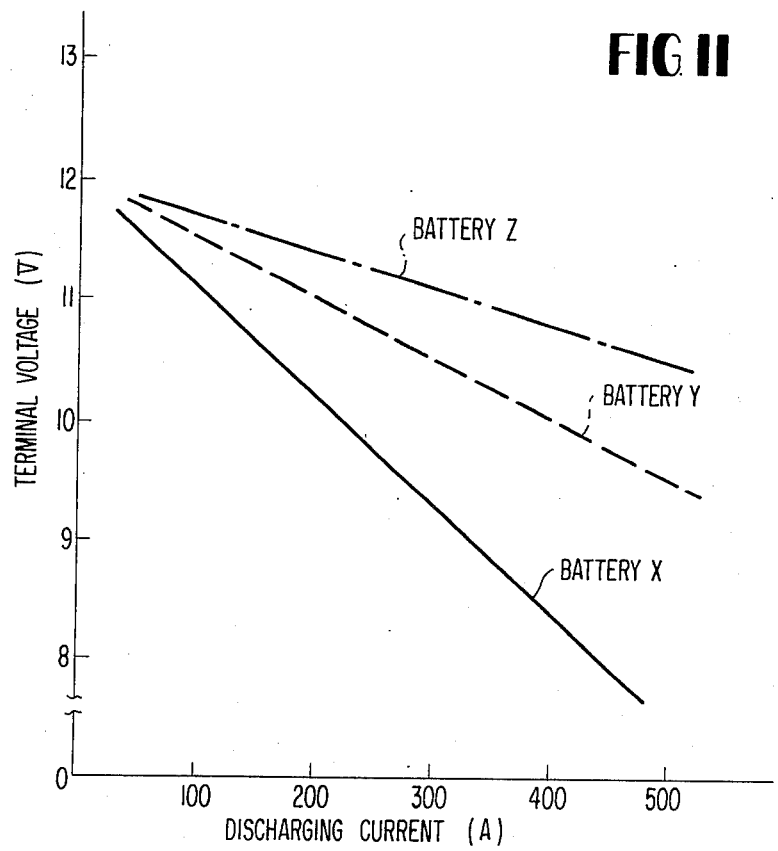
Figure 10A:
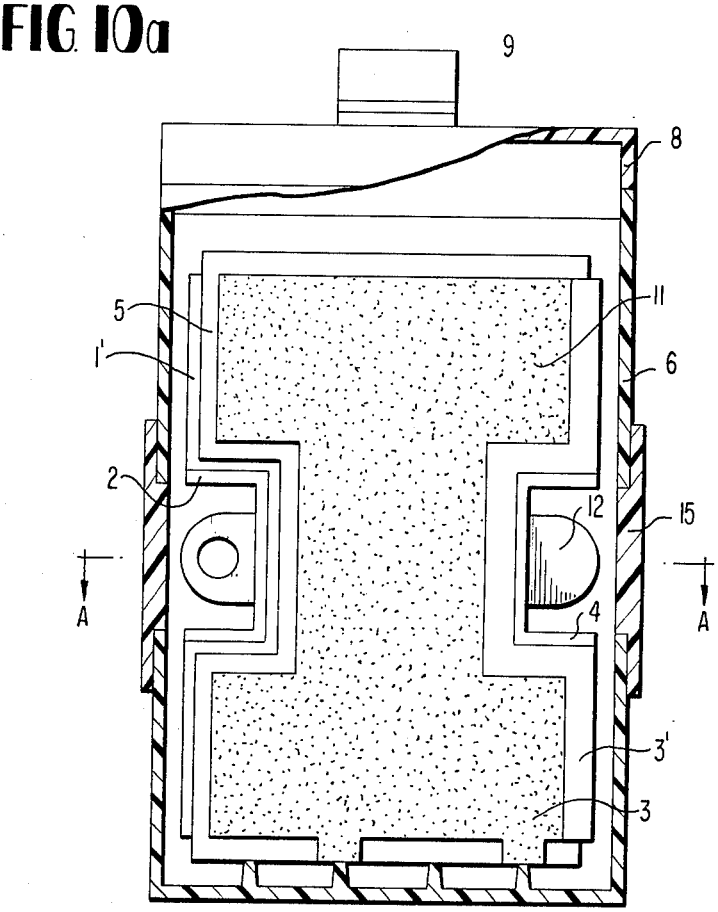
Figure 10B:
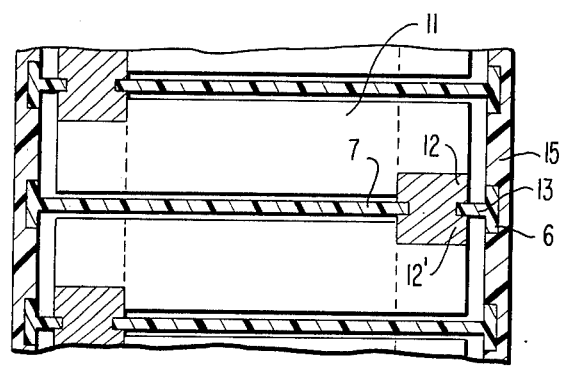

FIGS. 8, 9 and 10 respectively show other different embodiments of this invention in which FIGS. 8(a), 9(a), 10(a) show respectively corresponding vertical section is part and FIGS. 8(b), 9(b) and 10(b) show respectively corresponding transverse section in part thereof; and FIG. 11 is a graphic representation showing the results of experiments for determining the relation between discharging current and terminal voltage of a lead battery of this invention.

PREFERRED EMBODIMENT OF THE INVENTION

The internal resistance of a lead battery is mainly composed of that of positive and negative plates, of straps and poles for positive and negative plates, as well as of connectors for use with the connection of cells (The internal resistance of electrolyte and that of terminals have no direct concern on the present subject and are not mentioned here particularly although they are not negligible).

In this regard, the most important factor among others is positive and negative plates as a source for the discharging reaction and, in particular, configuration and disposition of grid members therein. The resistance of a plate varies significantly depending upon the position and configuration of a current take out port of a plate (lug).

Figure 1A:
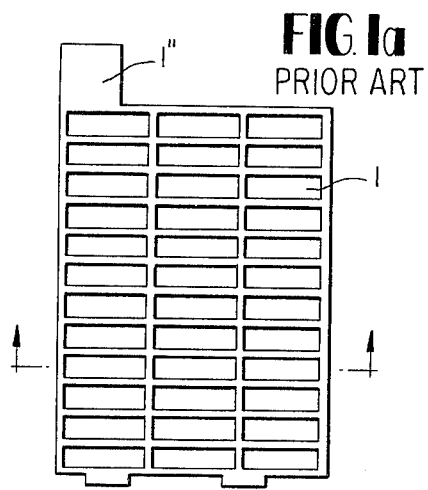
FIG. 1(a) is a plan view of a grid for use with a conventional lead acid battery and FIG. 1(b) is a transverse sectional view of a part thereof.
Figure 2A:
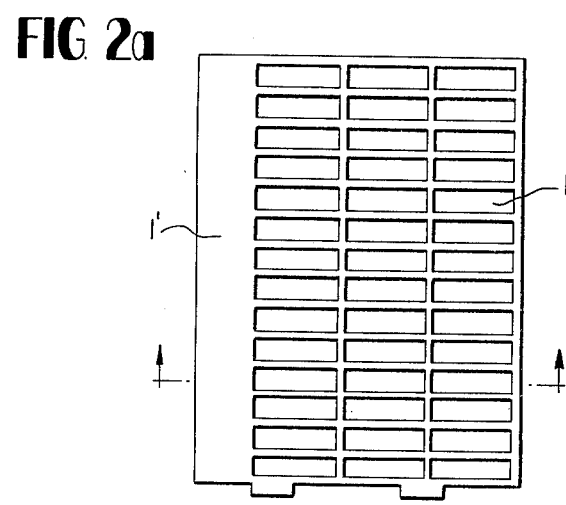
FIG. 2(a) is a plan view of one embodiment of a grid in a lead acid battery of this invention and FIG. 2(b) is a transversal sectional view of a part thereof.
Figure 1B:
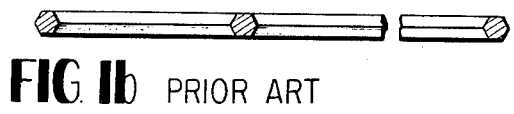
Figure 2B:
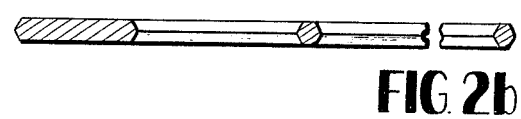

In order to study these factors, the inventors have manufactured and tested various types of grids having different dispositions, configurations and weight distributions for each of the portions regarding the grid members, as well as the shapes and disposition of current take out ports. The most reliable test data might have been obtained by conducting the tests on actual batteries, but since it would require too many battery samples, the test were conducted actually by the following manners. Grids having different values for certain factors were supplied with current as cathode in diluted sulfuric acid, and the level of voltage drop at each point relative to the current take out port was measured. Based on the results obtained from above measurement, grids producing the smallest iR drops were selected, actual batteries were made therewith and electric power characteristics of them were determined. In these experiments, a grid of conventional type as shown in FIG. 1 or a battery made therewith was always used as a comparison for the aid of the evaluation of the test results. In FIG. 1, reference numeral 1 denotes a grid and numeral 1'' represents a lug for a plate. In FIG. 2, numeral 1 represents a plate and 1' is a band-shaped portion.

Figure 3A:
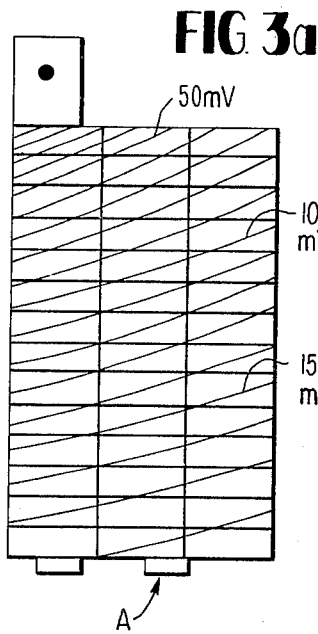
FIG. 3 is a diagrammatic view of a grid for showing the result of the experiment determining the distribution of voltage drops.

The results obtained from the measurement for the amount of voltage drops through grids are to be described referring to FIG. 3. The same value of current was fed under cathodic condition in diluted sulfuric acid (having specific gravity of 1.26 at 20°C) through a grid (A) of conventional type (the same as that shown in FIG. 1) having a height greater than width and grids (B) and (C) (the same as that shown in FIG. 2) each having the same configuration and weight as those of type (A) but having a band-shaped portion at one side and provided with a current take out port there. The current take out port is provided at the upper portion in the type (B) and at the middle portion in the type (C), that is, they are situated respectively corresponding to the positions of straps and poles. Several conductors are welded to the grids for the measurement of voltage drop from the current take out port shown by the black points in the drawing. Based on the results of the measurement, equipotential lines were plotted on the surface of the grids by connecting the points representing the same levels of iR drop. This is illustrated in FIG. 3 wherein greater iR drops were shown to be generated in a grid having more equipotential lines each of which is prepared with an equal potential interval (a 10 mV interval in the illustrated example) as well as in that portion of the grid containing a closer pattern of the lines.

It is apparent from FIG. 3 that a grid formed with a band-shaped portion throughout the length for one of the sides thereof and, in particular, a grid having a current take out port at the half height of the side of said plate shows less iR drop than the grid of conventional type and hence has excellent advantages over the latter.

The effect described above is especially remarkable with a grid having a height greater than width. The effect can, of course, be obtained in a grid having a height equal to the width. Further, the effect of this invention can be obtained even with a grid having a width greater than height, that is, having width to height ratio up to about 1.2 : 1.

In order to prevent short circuit between adjacent positive and negative plates, a separator put between the positive plate and the negative plate should sufficiently shield active substance that is filled in both of said plates, respectively. In the conventional batteries, for this reason, separators have been designed somewhat larger than the plates both in width and height and the separators have been disposed so that they slightly exceed the edges of said plates. In the battery structure of this invention, however, straps are provided along one of the vertical sides of the plates and this hinders the extension of separators beyond the width of the plates as done in the conventional battery. In order to overcome this difficulty, a band-shaped portion is formed at the edge of a grid that faces to the strap in this invention, which enables the separator to be extended beyond the portion of grid filled with active material by a sufficient length to prevent short-circuit.

The band-shaped portion described above serves effectively for reducing the iR drops as already described as well as for the prevention of short-circuit. It is required that the band-shaped portion has a width large enough to dispose a separator extending beyond the portion of the grid filled with active material at least by such a length as required for preventing short-circuit between adjacent positive and negative plates. The width of the band-shaped portion can optionally be great so long as the volume of the battery permits and greater width is preferred for the reduction of voltage drop.

Figure 4D:
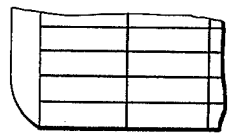
FIG. 4 is a segmentary view of a grid for use with a lead battery of this invention.
Figure 4E:
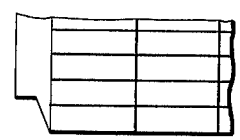

The band-shaped portion is usually formed throughout the length of one side of the grid to be provided with a strap, but an upper or lower corner of that portion can be cut away, if desired, as shown in FIGS. 4(d) and (e) without substantially giving adverse effects on the merits of this invention. The width of the band portion is not always required to be uniform throughout its length, although usually it is so, but allowed to enlarge toward the current take out port.

Figure 3B:
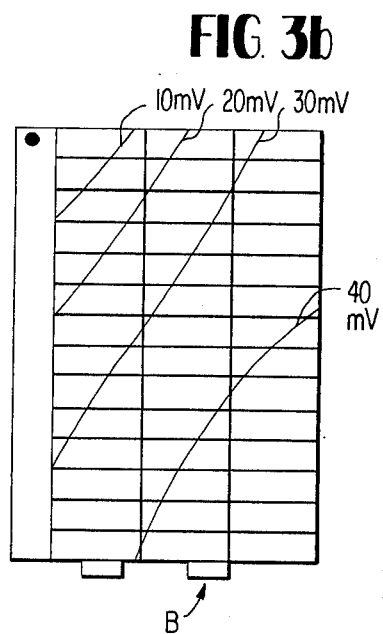

In this invention, straps can be provided to the entire side by connecting the whole of the band-shaped portion of a grid, or they may be provided so as to connect only the upper end, middle part, upper half, etc. It is most effective for the reduction of voltage drop to mount a strap to the band-shaped portion containing the middle area of a grid side and dispose a current take out port at or nearest to the center of the side. Even in a grid, having a current take out port at the upper end as shown in FIG. 3(b), the voltage drop is much lower than that in conventional grids because of the presence of the foregoing band-shaped portion. By locating the current take out port in a strap at one-fourth - three-fourths of the height of a grid, the effect of the present invention can be increased significantly.

The effect of the present invention is particularly outstanding when using thin plates, for example, using grids of less than 2 mm and particularly, less than 1 mm thickness.

Figure 3C:
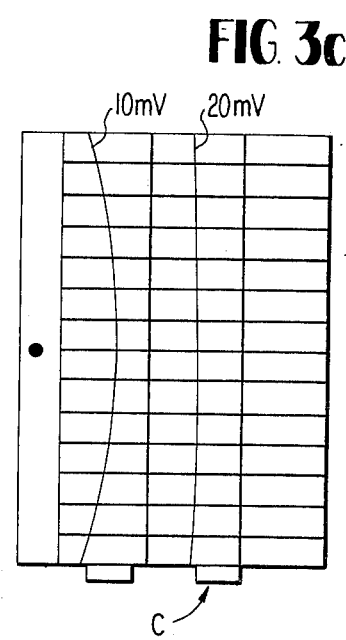

The inventors have further studied on the width of cross members that constitute each portion of a grid. iR drops at the center of grids relative to the current take out port were measured by varying the total weight of grid members in vertical component and those in transversal component, and the results are shown in Table 1. The point from which the current is taken out was set at the middle of the side of the grids as shown in FIG. 3(c). It can be seen from the results that iR drops can be decreased when the total weight of the transversal component of the grid members excepting the peripheral frames of the grids is greater, particularly, by the factors of three or more than those in the vertical components.

Table 1

| Ratio of total weight in vertical component (A) to that of transversal component (B) of grid members | iR drop between the center and the current take out port (lug) of the grid (mV) |
|---|---|
| A/B = 1/1 | 57 |
| A/B = 2/1 | 38 |
| A/B = 3/1 | 23 |
| A/B = 5/1 | 18 |

Figure 5:
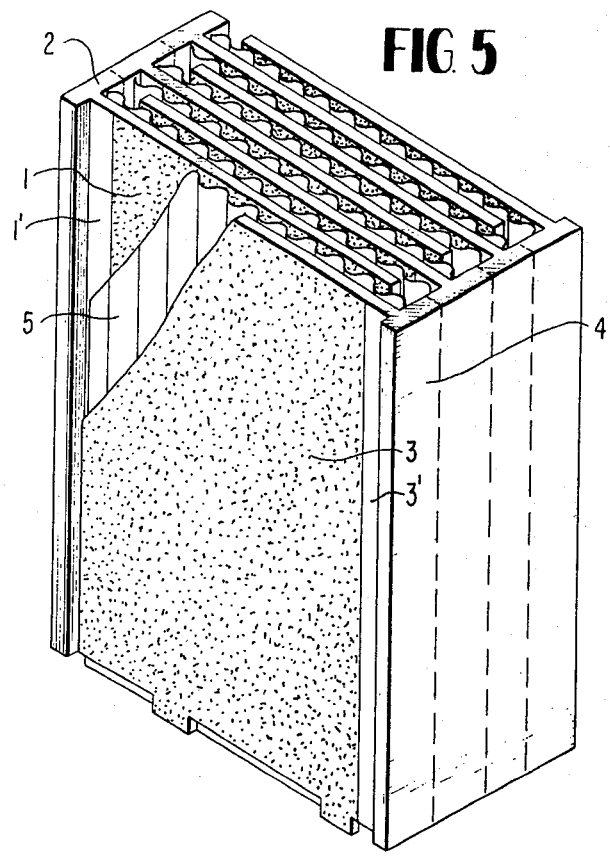
FIG. 5 is a partially cut away perspective view showing an assembled element of a lead acid battery of this invention.

A preferred embodiment of an assembled element having grids that are manufactured suitably based on the foregoing results is shown in FIG. 5, wherein numeral 1 denotes a positive plate formed with a band-shaped portion 1' along the entire length of one side thereof and connected to a positive strap 2 for electrically connecting a plurality of such positive plates together. Each of a negative plate 3, band-shaped portion 3' for the negative plate and a negative strap 4 has the same construction as corresponding members in the positive side, and these members 3' and 4 are situated opposite to members 1' and 2 respectively.

Figure 6A:
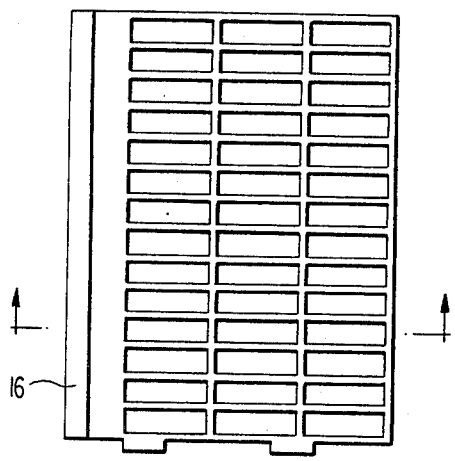
FIG. 6(a) is a plan view of one embodiment of a grid for use with a lead acid battery of this invention and FIG. 6(b) is a partially sectional view thereof.
Figure 6B:

Positive strap 2 or negative strap 4 may be formed by laminating the positive plate 1, separator 5 and negative plate 3 in order and then adding thereto additional lead alloy by way of melting and solidification according to the conventional method. Alternatively, it may be formed by previously making an enlarged portion at the transverse end 16 of the grid as shown in FIG. 6 for the strap, layering plates and separator and then partially or entirely melting and solidifying said enlarged portion. In the latter method, the thickness $d$ of the portion 16 of the grid is desirably greater than that portion filled with active substance but less than the sum of the thickness of a sheet of positive plate, a sheet of negative plate and two sheets of separator since the separators can then press the surface of plates and, therefore, effectively prevent the active substance from shedding.

Figure 7:
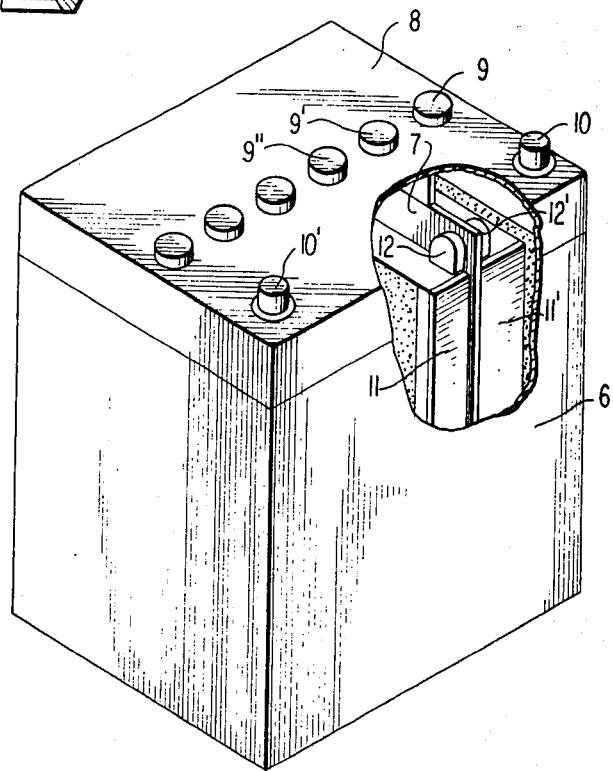
FIG. 7 is a partially cut away perspective view showing one embodiment of a lead battery of this invention having assembled elements showing in FIG. 5.

An embodiment of a battery structure is shown in FIG. 7, in which assembled elements shown in FIG. 5 are used and are connected to each other by the connector at the current take out ports provided at the upper parts thereof. In the figure, there are shown container 6, partition wall 7 between cells, cover 8, vent plugs 9, 9' and 9'', terminal 10 and 10', assembled elements 11 and 11', and poles 12 and 12' that are integrated with a connector passing through the partition walls 7 in an air tight manner. In these elements, straps may only be formed at least in those areas containing the upper parts of the grids.

In FIG. 8, another structure of the battery is shown, in which assembly elements shown in FIG. 5 are used and are connected with each other at portions projected from the side walls of the container by way of poles provided at the middle of elements' sides.

In the figure, there are shown band-shaped portion 1' for a positive plate, positive strap 2, negative plate 3, band-shaped portion 3' for the negative plate, negative strap 4, separator 5, container 6, partition wall 7, cover 8, vent plug 9, assembled element 11, negative and positive poles 12 and 12' of adjacent cell, connector 13 for the connection of assembled elements, and sealing parts 14 for closing the ports of the container.

The positive pole 12 and the negative pole 12' are connected to the positive and negative straps 2 and 4 respectively, for example, by way of welding and project out of the side wall of the container, and these poles are electrically connected to each other by the connector 13. The connector 13 may be lead alloy but it is preferred to constitute its portion which is not directly contacted with the electrolyte, i.e., the portion which projects out of the side wall of the container 6, with such metals as copper, aluminum, silver, nickel, tin zinc or the like as well as alloys mainly composed of these metals, for the reduction of weight and the electrical resistance. The above described projected portion may be plated or coated with lead, if required. Sealing parts 14 for the ports of the container serve as receivers for the connector 13 as well as sealant for the openings in the side wall of the container. The parts 14 consist of plastic molded products, sealing adhesives, etc.

The battery shown in FIG. 8 has electrode poles provided at the middle of the elements' side and, consequently, has projected portions on the side wall of the container. This means that a greater space is required for disposing batteries when a plurality of them are arranged side by side. In order to minimize the space, it is desired to arrange the electrode poles as shown in FIG. 9, in which projected portions of batteries F and G comprising poles 12a, 12b, 12c and 12d are disposed while shifted upward and downward respectively one from another relative to the center of the height of the side wall, so that these corresponding projected portions lie one upon another to save the space required for batteries F and G when they are arranged in adjacent with each other.

A further embodiment of battery structure is shown in FIG. 10, in which assembled elements are connected by utilizing recesses provided in the middle of the sides of the elements. In the figure, for providing a recess in the middle of the element' side, positive and negative plates, and separators that are recessed at the middle of the both sides thereof are used. Reference numerals 2 and 4 represent positive and negative straps respectively. Numerals 12 and 12' are positive and negative poles respectively and they are serve to keep the apertured part in the partition wall 7 in an air tight condition in corporation with connector 13. Numeral 15 denotes sealing parts for sealing the opening in the side wall of a container provided for the connection work between assembled elements and it forms a part of the side wall of the monoblock container after the battery has been assembled. The battery of the illustrated structure has an advantage in that the side wall of the container thereof is substantially flat and includes no large projections as in the battery shown in FIG. 7.

A battery X of a conventional type shown in FIG. 1, and batteries Y and Z having the structure according to this invention and shown in FIGS. 7 and 8 respectively are assembled for the test. All of the batteries were designed so as to have a weight of 12.5 Kg as filled with electrolyte, and discharge capacity of 30 AH at 5 hr rate. They were discharged at various levels of discharging current under the ambient temperature and electrolyte temperature of 25°C, and the terminal voltage was measured five seconds after the initiation of the discharge. The results are shown in FIG. 10. The internal resistance was determined based on the slants of terminal voltages versus discharging currents shown in FIG. 10 and they were 9 mΩ/ 6 cells for the cell X of the conventional type, 5 mΩ/ 6 cells and 3 mΩ/ 6 cells respectively for cells Y and Z according to this invention. It can apparently be seen from the above results that the batteries according to this invention have less internal resistance and, hence, excellent advantages.

What is claimed is:

1. A lead acid battery including a container enclosing assembled elements each of which comprises a plurality of positive and negative plates each of which is composed of a grid filled with active material and formed with an integral band-shaped portion along the length of only one end thereof facing a side wall of the container, said plates being layered one upon another with separators therebetween in such a way that the respective band-shaped portions for the positive plates and negative plates respectively face opposite side walls of the container, a positive strap connected to said positive plates along at least a part of the length of the band-shaped portions thereof, and a negative strap connected to said negative plates along at least a part of the length of the band-shaped portions thereof.

2. A lead acid battery as defined in claim 1, wherein the band-shaped portions have sufficient width for permitting plate separators to extend beyond the portions of grids that are filled with active material at least by such an extent as required to prevent a short-circuit between adjacent positive and negative plates.

3. A lead acid battery as defined in claim 1, wherein the straps are connected along the entire length of the band-shaped portions of said positive and negative plates.

4. A lead acid battery as defined in claim 1, wherein the straps are provided at the areas containing one-fourth - three-fourth height of the grids from the bottom and poles are provided within the above height range.

5. A lead acid battery as defined in claim 1 and including separators between adjacent plates in each of said elements, and wherein each band-shaped portion has, at its end in the direction of grid width, a thickness greater than that of the portion of the grid filled with active material but smaller than the sum of the thicknesses of one positive and one negative plate and two separators.

6. A lead acid battery as defined in claim 1, wherein the total weight of the horizontal components of a grid is heavier than that of the vertical components.

7. A lead acid battery as defined in claim 4, wherein straps are provided to the band-shaped portions containing the middle areas of the side of the grids, and said poles are situated at said middle areas.

8. A lead acid battery as defined in claim 4 in combination with a second lead acid battery, wherein connecting portions between straps and connectors for the connection of assembled elements are projected out of the side walls of the battery containers, and said connecting portions for the two batteries are disposed so as to lie one upon another.

9. A lead acid battery as defined in claim 8, wherein a grid has on the side of a band-shaped portion a recess in which a strap is connected to the connector for the connection of the elements.

10. A lead acid battery as defined in claim 6, wherein the total weight of the horizontal components of a grid is three times as much or more than that of the vertical components.

* * * * *